United States Patent [19]
Harada

[11] Patent Number: 5,399,184
[45] Date of Patent: Mar. 21, 1995

[54] METHOD FOR FABRICATING GAS DIFFUSION ELECTRODE ASSEMBLY FOR FUEL CELLS

[75] Inventor: Hiroyuki Harada, Yokohama, Japan

[73] Assignee: Chlorine Engineers Corp., Ltd., Tokyo, Japan

[21] Appl. No.: 54,294

[22] Filed: Apr. 30, 1993

[30] Foreign Application Priority Data

| May 1, 1992 | [JP] | Japan | 4-112879 |
| Jun. 5, 1992 | [JP] | Japan | 4-145515 |
| Jul. 1, 1992 | [JP] | Japan | 4-174480 |

[51] Int. Cl.$^6$ ............................. H01M 8/10
[52] U.S. Cl. .................... 29/623.4; 427/115; 29/623.5
[58] Field of Search ............ 29/623.4, 623.5; 427/115

[56] References Cited

U.S. PATENT DOCUMENTS

| 4,272,560 | 6/1981 | Baczek et al. | 427/115 X |
| 4,876,115 | 10/1989 | Raistrick | 427/115 |
| 5,211,984 | 5/1993 | Wilson | 427/115 |
| 5,242,764 | 9/1993 | Dhar | 29/623.4 X |

OTHER PUBLICATIONS

Shimshon Gottesfeld, et al., *Recent Advances in PEM Fuel Cell Research at Los Alamos National Laboratory*, Los Alamos National Laboratory, Los Alamos, N. Mex, pp. 1-3 (date unknown).

M. S. Wilson et al., *Thin-film catalyst layers for polymer electrolyte fuel cell electrodes*, Journal of Applied Electrochemistry 22 (1992), pp. 1-7 (month not available).

M. S. Wilson et al., *High Performance Catalyzed Membranes of Ultra-low Pt Loadings for Polymer Electrolyte Fuel Cells*, J. Electrochem. Soc., vol. 139, No. 2, Feb. 1992, pp. L28-L30.

*Primary Examiner*—Stephen Kalafut
*Attorney, Agent, or Firm*—Burns, Doane, Swecker & Mathis

[57] ABSTRACT

A method for fabricating an electrode assembly for solid polymer electrolyte fuel cells comprising a cation exchange membrane as the electrolyte and electrode catalyst layers, which utilizes specific perfuluorosulfonic acid copolymers for the cation exchange membrane and a binder used for preparing the electrode catalyst layers or bonding the cation exchange membrane and the electrode catalyst layers and provides electrode assemblies for the fuel cells being capable of providing fuel cells having a high cell voltage with high efficiency.

10 Claims, 1 Drawing Sheet

FIG. 1

METHOD FOR FABRICATING GAS DIFFUSION ELECTRODE ASSEMBLY FOR FUEL CELLS

BACKGROUND OF THE INVENTION

1. Field of the Invention

This invention relates to a method for fabricating a gas diffusion electrode assembly for fuel cells. More specifically, it relates to a method for fabricating a gas diffusion electrode assembly for proton exchange membrane fuel cells comprising gas-diffusible electrodes and a cation exchange membrane through which protons migrate.

2. Prior Art

Fuel cells of solid polymer electrolyte type utilizing cation exchange membranes as electrolyte have been developed as the forth generation type of fuel cell following the ones of phosphoric acid type, molten carbonate type and solid electrolyte type. Various developments as to the fuel cells of this type are being conducted because they can show higher electromotive force per unit area and hence they can be made smaller as compared with the precedent fuel cells.

Figure 1:
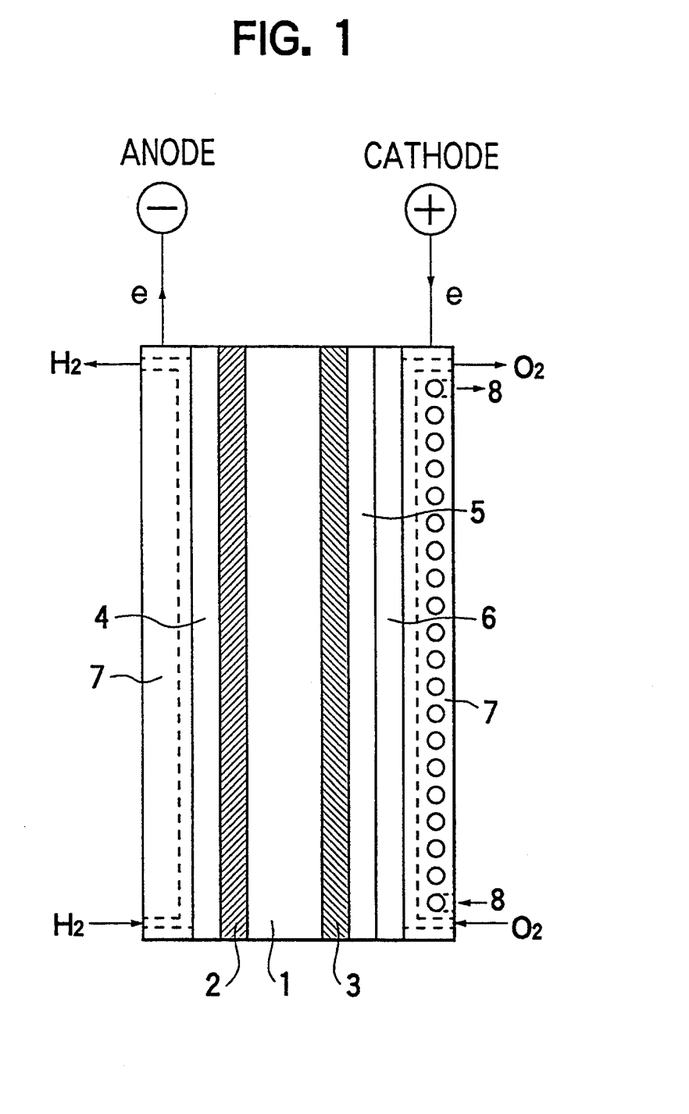
FIG. 1 shows a schematic cross-sectional view of a proton exchange membrane fuel cell utilizing a cation exchange membrane and an electrolyte.

Fuel cells of this type are usually called "Proton Exchange Membrane Fuel Cells" (PEMFC's) and have a structure shown in the appended FIG. 1. Generally, perfluorosulfonic acid type cation exchange membranes are considered suitable for the solid polymer electrolyte, which is the most important component of PEMFC, because of their durability, chemical resistivity, oxidation resistance, thermal stability and so on. However, it is still important to select an appropriate combination of the proeperties of cation exchange membrane and electrode catalyst layers to be bonded to the membrane so that well-balanced cell characteristics can be obtained.

Hitherto, as the cation exchange membrane for PEMFC's, mainly used are commercially available perfluorosulfonic acid type of cation exchange membranes such as NAFION membranes available from E. I. DuPont Nemours and Co., U.S.A. such as NAFION 117, which has protons on ion-exchange groups (H-form) and has an ion-exchange capacity of 0.909 meq/g of dry resin and a membrane thickness of about 178 μm. However, when these commercially available membranes are used in PEMFC's, thicknesses of these membranes are generally too large to obtain acceptably low electric resistivity of the membrane and, as a result, cell voltage is low. In particular, when air is fed to the anodes of PEMFC's, high cell voltage cannot be obtained by these membranes and hence this drawback of these membranes is a serious problem in practical applications of PEMFC's.

On the other hand, because PEMFC's have electrode catalyst layers on the cation exchange membrane as shown in FIG. 1, it is important that both the electrode catalyst layers and properties of the cation exchange membrane are sufficiently integrated so that both components, i.e., the cells, can show sufficient characteristics. Therefore, the method for bonding the cation exchange membrane and the electrode catalyst layers is also important.

Conventional methods for bonding a cation exchange membrane and an electrode catalyst layer or forming an electrode catalyst layer on a cation exchange membrane include a method comprising uniformly applying a preliminarily provided mixture containing electrode catalyst loaded on fine carbon particles and a polytetrafluoroethylene dispersion as a binder on aluminum foils, drying the mixture to form electrode catalyst layers and bonding the resulted electrode catalyst layers on both surfaces of cation exchange membranes of H-form (having protons (H+) as the cations of the ion exchange groups) by hot pressing; and a method comprising directly applying said mixture on the cation exchange membrane, drying the mixture and subjecting the membrane having the dried layer to hot pressing. However, in these conventional methods, it is rather difficult to establish the conditions of the hot pressing, because the softening temperature of the polytetrafluoroethylene is quite higher than that of H-form perfluorosulfonic acid membrane and because it is necessary to vary the hot pressing temperature depending on the mixing ratio of the fine carbon particles and the polytetrafluoroethylene emulsion. Furthermore, the electrode catalyst layers formed by these method are likely to become thick, and hence the obtained PEMFC's are likely to be expensive because noble metal such as platinum is usually used for the catalyst.

It is also possible, when H-form cation exchange membranes such as the above-mentioned NAFION 117 are used, to form electrode catalyst layers on the cation exchange membranes by preparing a mixture of a solution of H-form of perfluorosulfonic acid copolymer similar to that of the cation exchange membranes and catalyst loaded on fine carbon particles, uniformly applying the mixture on either or both surfaces of the cation exchange membrane, drying the mixture and subjecting the dried layers to hot pressing together with the membrane in a manner similar to the method described above. However, because the softening temperature of the H-form cation exchange membrane is rather low, it is necessary to carry out the hot pressing at a quite low temperature, for example, at a temperature lower than about 140° C. The hot pressing at such a low temperature leads to insufficient bonding of the electrode catalyst layers and the cation exchange membranes.

Therefore, there is still a need for an improved method for bonding the cation exchange membrane, electrode catalyst layers and carbon cloth or paper in the fabrication of PEMFC's in view of characteristics and cost of the cells, efficiency of the method and the like.

OBJECT AND SUMMARY OF THE INVENTION

An object of the invention is to provide a method for fabricating an electrode assembly for solid polymer electrolyte fuel cells, which assembly is capable of providing a proton exchange solid polymer electrolyte fuel cell having a high electromotive force.

Another object of the present invention is to provide a method for fabricating a less expensive electrode assembly for solid polymer electrolyte fuel cells.

Yet another object of the present invention is to provide a method for fabricating an electrode assembly for solid polymer electrolyte fuel cells with high efficiency.

The inventor has continued research, regarding the characteristics of the cation exchange membranes and the method for bonding the cation exchange membranes and electrode catalyst layers from the above viewpoints, and as a result, found that an electrode assembly for PEMFC's, which assembly is capable of providing PEMFC's having a high electromotive force, can be obtained by using a cation exchange membrane having an appropriate thickness, high ion-exchange capacity and a specific method for bonding the cation exchange membrane and the electrode catalyst layers and achieved the present invention.

Therefore, in one embodiment, there is provided in accordance with the present invention a method for fabricating an electrode assembly for solid polymer electrolyte fuel cells comprising a cation exchange membrane and an electrode catalyst layer or layers bonded to either or both of the surfaces of the membrane, the method comprising the steps of:

(a) providing a cation exchange membrane comprising a perfluorosulfonic acid group-containing copolymer comprising tetrafluoroethylene units and perfluorovinyl ether units having sulfonic acid groups on their side chains and represented by the following formula (1) or (2);

wherein X represents Na or K, k is about 2.1 to about 7.6, m is about 3.8 to about 9.3 and l and n represent a positive integer, where the membrane has a thickness of from 50 to 150 μm in dry state at room temperature and an ion exchange capacity of 0.83 to 1.43 meq/g (dry resin), (b) forming an electrode catalyst layer or layers on either or both of the surfaces of the cation exchange membrane by;

(i) preparing a uniform mixture of fine carbon particles coated with electrode catalyst and a solution or dispersion of a perfluorosulfonic acid copolymer represented by the above formula (1) or (2) having hydrogen atoms as X in a solvent mainly composed of lower aliphatic alcohol, (ii) converting the copolymer contained in the mixture into K-form when the sulfonic acid groups contained in the cation exchange membrane are of K-form, or into Na-form when the sulfonic acid groups contained in the cation exchange membrane are of Na-form, (iii) uniformly applying the resulted mixture on either or both of the surfaces of the cation exchange membrane,

(iv) drying the applied mixture by placing the membrane having the applied mixture under atmospheric conditions at room temperature or under reduced pressure of not more than 30 mmHg at room temperature to sufficiently remove the solvent in the applied mixture, (v) subjecting the membrane having the dried mixture layer to hot pressing at a temperature lower than the softening temperature of the perfluorosulfonic acid membrane by 10° C. or more, and (c) converting the sulfonic acid groups in the cation exchange membrane and the electrode catalyst layer(s) into H-form by immersing the membrane having the electrode catalyst layer(s) in an aqueous solution of an acid.

In another embodiment, there is provided in accordance with the present invention a method for fabricating an electrode assembly for solid polymer electrolyte fuel cells comprising a cation exchange membrane provided with an electrode catalyst layer and a carbon cloth or paper layer in this order on each of the surfaces of the membrane, the method comprising the steps of:

(a) providing a cation exchange membrane comprising a perfluorosulfonic acid group-containing copolymer comprising tetrafluoroethylene units and perfluorovinyl ether units having sulfonic acid groups on their side chains and represented by the following formula (1) or (2);

wherein X represents H, Na or K, k is about 2.1 to about 7.6, m is about 3.8 to about 9.3 and l and n represent a positive integer, where the membrane has a thickness of from 50 to 150 μm in dry state at room temperature and an ion exchange capacity of 0.83 to 1.43 meq/g (dry resin), (b) bonding the electrode catalyst layers and the carbon cloth or paper layers on both surfaces of the cation exchange membrane by;

(i) preparing a uniform mixture of electrode catalyst loaded on fine carbon particles and a polytetrafluoroethylene dispersion, (ii) applying the mixture on a surface of a sheet of electroconductive and gas permeable carbon cloth or paper and subjecting the sheet having the applied mixture layer to hot pressing to obtain a carbon cloth or paper sheet for anode having an electrode catalyst layer formed from the applied mixture layer, (iii) repeating the procedure of the above step (ii) to obtain a carbon cloth or paper sheet having an electrode catalyst layer, applying a mixture containing fine carbon particles and a polytetrafluoroethylene dispersion to a surface of the sheet opposite to the one provided with the electrode catalyst layer and subjecting the sheet to hot pressing to obtain a carbon cloth or paper sheet for cathode having the electrode catalyst layer and a water-repellent layer formed from the applied mixture layer of fine carbon particles and a polytetrafluoroethylene dispersion, (iv) preparing a solution or dispersion of perfluorosulfonic acid copolymer represented by the above formula (1) or (2) where X represents the same element as the element X of the copolymer of the cation exchange membrane, (v) applying the solution or dispersion to either or both of the surfaces of the electrode catalyst layers formed on the carbon cloth or paper sheets for anode and cathode and the surfaces of the cation exchange membrane, (vi) stacking the cation exchange membrane and the carbon cloth or paper sheets so that each of the surfaces of the electrode catalyst layers formed on the carbon cloth or paper sheets are in contact with each of the both surfaces of the cation exchange membrane, (vii) subjecting the stacked cation exchange membrane and carbon cloth or paper sheets to hot pressing at a temperature lower than the softening temperature of the perfluorosulfonic acid copolymer of the cation exchange membrane by 10° C. or more to give the electrode assembly.

The proton exchange membrane fuel cell shown in FIG. 1 comprises a cation exchange membrane 1, anode catalyst layer 2, cathode catalyst layer 3, electoconductive carbon cloth or paper layer 4, 5, water-repellent layer 6 and carbon plates having grooves for feeding gas 7 (current collector). Flowing direction of cooling water 8 is also shown in FIG. 1.

DESCRIPTION OF PREFERRED EMBODIMENTS

The cation exchange membrane used in the present invention comprises a copolymer consisting of tetrafluoroethylene units and perfluorovinyl ether units having —$SO_3K$, —SO, Na or —$SO_3H$ groups on their side chains and represented by the above formula (1) or (2). The copolymers of this type having —$SO_3K$ or —$SO_3Na$ groups (K-form or Na-form) can be obtained by copolymerizing tetrafluoroethylene and corresponding perfluorovinyl ether having sulfonyl fluoride groups (—$SO_2F$) at the end of their side chains and treating the resulted copolymer membrane with a mixed solution of an aqueous or alcoholic solution of KOH or NaOH and/or dimethyl sulfoxide. Film-like copolymers having —$SO_3H$ groups (H-form) can be obtained by treating the film-like copolymers of K- or Na-form with a diluted solution of an acid such as sulfuric acid or hydrochloric acid.

In the first embodiment of the present invention, as described in detail hereinafter, K-form (containing —$SO_3K$ groups) or Na-form (containing —$SO_3Na$ groups) perfluorosulfonic acid copolymers are used for both of the binder of the electrode catalyst layer and the cation exchange membrane to facilitate the selection of the conditions for hot pressing. Furthermore, this also makes it possible to carry out the hot pressing at a higher temperature compared to the case where an H-form (containing —$SO_3H$ groups) perfluorosulfonic acid membrane is used, because K- and Na-form of perfluorosulfonic acid membranes have a higher softening temperature compared to H-form perfluorosulfonic acid membranes. The hot pressing at a higher temperature improves the contact and adhesion between the cation exchange membrane and the electrode catalyst layer.

The ion exchange capacity of the cation exchange membrane can be varied by changing the molar ratio of tetrafluoroethylene and perfluorovinyl ether having sulfonyl fluoride groups (—$SO_2F$) in the copolymerization. The cation exchange membrane should have an ion exchange capacity of from 0.83 to 1.43 meq/g of dry resin, preferably from 0.91 to 1.25 meq/g of dry resin. Sufficiently high ion exchange capacity is useful not only to reduce the resistivity of the membrane, but also to improve the ability for transferring protons to the cathode in PEMFC's, to elevate the equilibrium moisture content of the membrane and to prevent drying up of the membrane during the operation of the cell because the higher ion exchange capacity facilitate reverse diffusion of water formed at the cathode to the anode. A higher ion exchange capacity also improve electroconductivity of the membrane. However, too large ion exchange capacity is not preferred because various problems may arise such as the reduction of physical strength of the membrane and too high water content of the membrane.

The cation exchange membrane used in the invention should have a thickness in dry state of from 50 to 150 $\mu$m, preferably of from 70 to 140 $\mu$m. In addition to ion-exchange capacity, thickness of the membrane is an important factor from the viewpoint of the transfer of water formed at the cathode to the anode and, therefore, it is important to optimize the thickness of the membrane as well as the ion exchange capacity to maintain suitably balanced cell characteristics.

The electrode catalyst used in the electrode catalyst layer may be selected from materials conventionally used in solid polymer electrolyte fuel cells such as Pt, Rh, Ir and Ru. However, platinum is usually used for this purpose, and it is used in the form of, for example, carbon particles of a diameter of from about 50 to 100 angstroms coated with platinum catalyst of a diameter of from about 15 to 30 angstroms generally in an amount of 10 to 20% by weight of the carbon particles. Such fine carbon particles coated with platinum catalyst are commercially available, and such commercial products include PLATINUM on VULCAN XC-72 and PLATINUM on VULCAN XC-72R manufactured by E-TEK Inc., which comprises carbon particles having a diameter of about 100 angstroms and a surface area of from 100 to 200 m$^2$/g and coated with platinum of a diameter of about 20 angstroms in an amount of 5 to 30% by weight of the carbon particles.

The electroconductive and gas-permeable carbon cloth or paper used in the present invention is selected from those materials conventionally used in solid polymer electrolyte fuel cells. Examples of the carbon cloth or carbon paper include plain weave fabric of carbon fibers manufactured by various weaving methods, nonwoven fabric, carbon paper made of carbon fiber. These carbon cloth or paper preferably have a thickness of from 0.2 to 0.5 mm and a unit weight of from 100 to 400 g/m$^2$.

Preferred commercially available carbon cloth or paper products are Torayca fabric (plain weave fabric) available from Toray Inc. such as Torayca #6344B (thickness: 0.38 mm, unit weight: 320 g/m$^2$) and Torayca #6343 (thickness: 0.27 mm, unit weight: 200 g/m$^2$) and Torayca carbon fiber paper available from Toray Inc. such as Torayca TGP-120 (thickness: 0.37 mm, unit weight: 170 g/m$^2$). Further, as described hereinafter, electrode subassemblies comprising these cloth or paper products provided with an electrode catalyst layer are also commercially available.

In the first embodiment of the present invention, as described hereinbefore, the electrode catalyst layer is formed on the cation exchange membrane by applying a mixture in the form of a paste comprising electrode catalyst particles and a solution or dispersion of a perfluorosulfonic acid copolymer of the same form as of the cation exchange membrane in a solvent mainly composed of lower aliphatic alcohol to the surface of the cation exchange membrane, drying the applied mixture and subjecting the cation exchange membrane having the applied and dried mixture layer to hot pressing.

That is, when the sulfonic acid groups contained in the cation exchange membrane are K-form, i.e., they have potassium atoms as X in the formulae (1) and (2), a perfluorosulfonic acid copolymer of K-form is used as the binder of the electrode catalyst layer. When they are Na-form, i.e., they have sodium atoms as X in the formulae (1) and (2), a perfluorosulfonic acid copolymer of Na-form is used as the binder. According to the present invention, it is necessary that the forms of the cation exchange membrane and the binder are the same as each other, but the structures of the copolymers of the cation exchange membrane and the binder may be different from each other. That is, a cation exchange membrane composed of a copolymer represented by the formula (1) may be used in combination with a binder composed of a copolymer represented by the formula (2) and vice versa.

The above described paste may be prepared by providing a solution or dispersion of a perfluorosulfonic acid copolymer represented by the formula (1) or (2), which is of H-form, i.e., it has hydrogen atoms as X in the formulae (1) and (2), in a solvent, adding to the solution the catalyst particles comprising carbon particles coated with the catalyst material, sufficiently mixing the resolving mixture and adding to the mixture a KOH solution when the cation exchange membrane is K-form or a NaOH solution when the cation exchange membrane is Na-form in an amount stoichiometrically sufficient to convert the form of the copolymer contained in the paste from H-form to K- or Na-form. The solvent used for the preparation of the paste is typically a mixed solvent comprising water and a lower aliphatic alcohol, but it is not limited to such a mixed solvent. Solutions or dispersions of the perfluorosulfonic acid copolymer in a mixed solvent comprising water and a lower aliphatic alcohol are commercially available and an example of such commercial products is NAFION SOLUTION sold by Aldrich Chemical Co.

The catalyst and the polymer solution are mixed so that the paste contains the catalyst particles and the copolymer (solid content) of, typically, in a weight ratio of about 3:1.

The prepared paste is applied to either or both surface of the cation exchange membrane and dried to sufficiently remove the solvent. Then, the cation exchange membrane having the applied layer(s) is subjected to hot pressing at a temperature lower than the softening temperature of the copolymer constituting the cation exchange membrane by 10° C. or more. The paste is applied as uniformly as possible and dried under a reduced pressure immediately after the application or after drying under atmospheric conditions of a certain period. Preferably, the applied paste is dried under a reduced pressure of not more than 30 mmHg, more preferably not more than 1 mmHg, at room temperature immediately after the application to prevent swelling of the applied layer. The paste is applied in such a thickness that a suitable thickness of the electrode catalyst layer described hereinafter is obtained after the hot pressing and cooling. When the catalyst is platinum, it is preferably applied on the sheet in an amount of from 0.04 mg/cm$^2$ to 4.0 mg/cm$^2$.

After the removal of the solvent, the cation exchange membrane having the applied layer(s) is sandwiched between two TEFLON or stainless steel plates having smooth surfaces and subjected to hot pressing together with the TEFLON or stainless steel plates. The hot pressing temperature should be adjusted to a temperature lower than the softening temperature of the copolymer of the cation exchange membrane by 10° C. or more. The softening temperature of the copolymer is measured by the softening Temperature Measurement Test for thermoplastic films and sheets by thermomechanical analysis according to Japan Industrial Standard K 7196-1991. If the temperature is higher than the above defined temperature, the water contained in the applied layer is vaporized so rapidly that a uniform electrode catalyst layer cannot be obtained.

While the softening temperature of the copolymer of K- or Na-form varies depending on various factors such as molecular weight, ion exchange capacity and equilibrium moisture content of the copolymer, softening temperatures of the copolymers represented by the formulae (1) and (2) of K- or Na-form are generally higher than those of the copolymers of H-form, because the copolymers of K- or Na-form generally tend to form an ion crosslinking structure, and generally fall within a range of from about 190° to 260°C. Therefore, the hot pressing is generally carried out at a temperature of 250° C. or lower than 250° C., preferably at a temperature of 190° C. or lower than 190° C.

The hot pressing is sufficiently carried out with a pressure of from several 10's to 150 kg/cm$^2$ to ensure sufficient bondings between the catalyst particles and of the electrode catalyst layer and the cation exchange membrane. Duration of the hot pressing, though it may vary depending on the pressure, temperature and the like, generally ranges from several minutes to several 10's of minutes, for example, 5 to 60 minutes.

The thickness of the electrode catalyst layer is generally not more than 20 μm, preferably not more than 10 μm, though it should be varied depending on the amount of the catalyst contained in the electrode catalyst layer.

The copolymer both for the cation exchange membrane and for the binder of the electrode catalyst layer preferably have a molecular weight of from 50,000 to 1,500,000, more preferably from 10,000 to 1,000,000 from the view points of mechanical strength of the membrane and film-forming property of the copolymer. However, the molecular weight of the copolymer is not limited to these ranges.

After the hot pressing, the membrane having the electrode catalyst layer(s) formed from the applied mixture is cooled to room temperature and immersed in a diluted aqueous solution of an acid such as sulfuric acid or hydrochloric acid to make the copolymers constituting the cation exchange membrane and the electrode catalyst layer(s) into H-form copolymers.

The resulting electrode assembly is stacked with conventional carbon sheets, current collectors and the like to form a PEMFC.

In the second embodiment of the present invention, the electrode catalyst layers are formed by applying a uniform mixture in the form of a paste comprising the electrode catalyst and a dispersion of tetrafluoroethylene or partially degraded polytetrafluoroethylene as a hydrophobic binder to the abovedescribed carbon cloth or paper sheet and subjecting the sheet having the applied mixture layer to hot pressing. By this process, an electrode catalyst layer partially or substantially embedded in pores present on the surface of the sheet is formed on the carbon cloth or paper sheet. The catalyst is preferably applied on the sheet in an amount of from 0.04 mg/cm$^2$ to 4.0 mg/cm$^2$.

The paste containing the catalyst and the hydrophobic resin is applied to the sheet as uniformly as possible typically in an amount of 60 to 70 g of paste/m$^2$ of carbon cloth or carbon paper and dried under a reduced pressure after it is dried under atmospheric pressure at room temperature for a certain period or immediately after the application. The thickness of the electrode catalyst layer, though it should be varied depending on the amount of the catalyst applied to the sheet, generally ranges from 5 to 50 $\mu$m.

As the hydrophobic resin binder, polytetrafluoroethylene is generally used. The mixture in the form of paste comprising the electrode catalyst and the hydrophobic resin binder can be prepared by uniformly mixing carbon particles carrying the electrode catalyst material and a polytetrafluoroethylene dispersion. Usually, the carbon particles and the polytetrafluoroethylene dispersion is mixed in such a ratio that the resulting paste contains about 50% by weight of polytetrafluoroethylene.

The conditions for the hot pressing are not particularly limited, but the hot pressing is generally carried out with a pressure of 80 to 150 kg/cm$^2$ at a temperature of from about 290° to 350° C. for about 3 to 60 minutes. Though the polytetrafluoroethylene dispersion can be prepared by using water as a dispersion medium and a surfactant as a dispersing agent, various kinds of polytetrafluoroethylene dispersions are commercially available and such commercial products may be suitably used for the present invention. These dispersions comprise colloidal polytetrafluoroethylene particles.

Further, the carbon cloth or paper sheets provided thereon with an electrode catalyst layer partially or substantially embedded in the sheet are also commercially available from E-TEK Inc. and such commercial products include those having an electrode catalyst layer having a thickness of several 10's to 100 $\mu$m and comprising platinum catalyst in an amount of 0.04 to about 4.0 mg/cm$^2$.

As to the carbon cloth or paper sheet used at the cathode side of PEMFC, the surface of the sheet opposite to the one provided with the electrode catalyst layer should have water-repellent property to prevent the water formed at the cathode side from penetrating into the electrode catalyst layer. Such water-repellent property of the carbon cloth or paper sheet is ensured by applying a paste comprising carbon particles, which are similar to those used to form the electrode catalyst layer but do not have catalyst material, and a tetrafluoroethylene dispersion to the carbon cloth or paper sheet and subjecting the sheet to hot pressing. The conditions for the hot pressing for this purpose may be the same as those for the fabrication of the electrode catalyst layer, but the amount of the paste applied to the sheet should be reduced so that the electroconductivity and gaspermeability of the sheet are ensured. For example, the paste is applied to the sheet in such an amount that the paste is substantially embedded in the pores present on the surface of the sheet.

Thus obtained electrode catalyst layers formed on the carbon cloth or paper sheets are bonded to the cation exchange membrane. For the cathode side of the membrane, bonded is the carbon cloth or paper sheet having the water-repellent layer formed on the surface opposite to the one provided with the electrode catalyst layer.

The cation exchange membrane and the electrode catalyst layers formed on the carbon cloth or paper sheets are bonded by applying a solution or dispersion of the perfluorosulfonic acid copolymer represented by the formula (1) or (2) to either or both of the surfaces of the cation exchange membrane and the electrode catalyst layers, stacking the sheets and the membrane so that the surfaces of the electrode catalyst layers face to the membrane and subjecting the membrane and sheets to hot pressing.

When the electrode catalyst layers are bonded to the cation exchange membrane by hot pressing, the copolymer of the formula (1) or (2) contained in the solution or dispersion applied to the surface of the electrode catalyst layers and/or the cation exchange membrane should have the elements X the same as the elements X contained in the copolymer of the formula (1) or (2) constituting the cation exchange membrane. That is, when the cation exchange membrane has protons (H+) as X (H-form), a copolymer of the formula (1) or (2) having protons as X is used as a binder contained in the solution or dispersion. Similarly, when ion-exchange groups of the membrane has Na + (Na-form), the copolymer contained in the solution or dispersion should have Na+, and when ion-exchange groups of the membrane has K+ (K-form), the copolymer contained in the solution or dispersion should have K+. According to the present invention, it is necessary that the forms (H-, Na- or K-form) of the cation exchange membrane and the binder are the same as each other, but the structures of the copolymers of the cation exchange membrane and the binder may be different from each other.

The solution or dispersion of the copolymer preferably contains the copolymer in an amount of from 1 to 5% by weight of the solution or dispersion.

The above described solution or dispersion containing an H-form perfluorosulfonic acid copolymer represented by the formula (1) or (2) may be prepared simply by dissolving or dispersing the H-form copolymer in a solvent such as, but not limited to, a mixed solvent comprising water and a lower aliphatic alcohol. A solution or dispersion containing a K- or Na-form copolymer may be prepared by adding, to a solution or dispersion containing an H-form copolymer, stoichiometrically sufficient amount of about 5% solution of KOH or NaOH respectively to neutralize the solution or dispersion. Solutions of H-form perfluorosulfonic acid copolymers are commercially available and an example of such commercial products is the above-described NAFION SOLUTION (sold by Aldrich Chemical Co., a mixture containing 5% by weight of a copolymer in 85% by weight of lower aliphatic alcohol and 15% by weight of water).

By using a solution or dispersion of a perfluorosulfonic acid copolymer having the same elements of X as those of the cation exchange membrane as the binder for bonding the electrode catalyst layer and the cation exchange membrane, the layers and the membrane are easily bonded by hot pressing. Further, when the sulfonic acid group of copolymers are K- or Na-form, the hot pressing can be carried out at a higher temperature compared to the case where sulfonic acid group of the copolymer is H-form because K- and Na-form of copolymers have a higher softening temperature than those of H-form, and thus the contact and adhesion between the cation exchange membrane and the electrode catalyst layer are significantly improved.

The above prepared solution or dispersion is uniformly applied to either or both surfaces of the electrode catalyst layers provided on the carbon cloth or paper sheets and the surfaces of the cation exchange membrane and dried to sufficiently remove the solvent. The solution or dispersion is preferably applied in such amount that the dried layer have a thickness of from about 5 to 20 μm. Though the drying may be carried out under the same conditions as for the formation of the electrode catalyst layer, it can be generally carried out under a atmospheric pressure because the solution or dispersion is applied as a layer much thinner than the electrode catalyst layer and hence it is less likely to cause swelling.

Then, two electrode catalyst layers formed on the carbon cloth or paper sheets and a cation exchange membrane are stacked so that the surfaces of the electrode catalyst layers face to the cation exchange membrane and subjected to hot pressing at a temperature lower than the softening temperature of the copolymer constituting the cation exchange membrane by 10° C. or more to obtain an electrode assembly for PEMFC's.

The softening temperature of the copolymer is measured by the Softening Temperature Measurement Test for thermoplastic films and sheets by thermomechanical analysis according to Japan Industrial Standard K 7196-1991. If the temperature is higher than the above defined temperature, the water contained in the applied layer is vaporized so rapidly that sufficient contact and adhesion between the electrode catalyst layers and the cation exchange membrane cannot be obtained.

The softening temperature of the copolymers of H-form also varies depending on various factors such as molecular weight, ion exchange capacity and equilibrium moisture content of the copolymer. However, the copolymers represented by the formulae (1) and (2) of H-form generally have a softening temperature falling within the range of from 100° to 150° C., and therefore the hot pressing is generally carried out at a temperature of 140° C. or lower, preferably at a temperature of 130° C. or lower. When sulfonic groups of the copolymer is of K- or Na-form, the hot pressing is preferably carried out at a temperature within a range described hereinbefore as to the first embodiment of the present invention.

The hot pressing is carried out with a pressure of not lower than 80 kg/cm$^2$, preferably not lower than 120 kg/cm$^2$, when sulfonic acid groups of the copolymer are H-form, or with a pressure of not lower than 120 kg/cm$^1$, preferably not lower than 140 kg/cm$^2$, when sulfonic acid groups of the copolymer are K- or Na-form.

Duration of the hot pressing, though it may vary depending on the pressure, temperature and the like, generally ranges from several minutes to several tens minutes, for example, 5 to 60 minutes.

The copolymer of the cation exchange membrane preferably has a molecular weight within a range described hereinbefore as to the first embodiment of the present invention. The copolymer contained in the solution or dispersion preferably has a molecular weight nearly equal to or slightly lower than that of the copolymer of the cation exchange membrane so that the copolymer is at least acceptably dissolved or dispersed in a solvent.

After the hot pressing, the resulted gas-diffusible electrode assembly for fuel cells is cooled to room temperature and immersed in a diluted aqueous solution of an acid such as 5% sulfuric acid solution for 16 hours to make the copolymers into H-form copolymers.

As shown in FIG. 1, there are placed carbon plates 7, which are prepared by blending fine carbon powder and polyvinylidene fluoride powder or low molecular weight type of degraded polytetrafluoroethylene powder in dry state and molding the blend into plates by hot pressing, on the carbon cloth or paper sheets. These carbon plates have a thickness of several mm and have perpendicular grooves for gas feed having a width of about 1.0 to 1.5 mm and depth of about 1.0 to 1.2 mm with intervals of about 1.0 to 1.5 mm, through which fuel gas is fed upwardly.

PEMFC's comprising the gas-diffusible electrode assemblies prepared in accordance with the present invention can be operated by feeding hydrogen/air or oxygen gases. The anode fuel gas for the PEMFC's may be obtained from various sources and examples of the anode fuel gas include reformed natural gas ($H_2/CO_2$ gas containing less than 5 ppm of CO), methanol/water reforming gas ($H_2/CO_2$ gas containing less than 5 ppm of CO), hydrogen gas desorbed form hydrogen storage alloys, CNG reforming gas (hydrogen containing gas containing less than 5 ppm of CO) and hydrogen produced at anode of brine electrolysis. The hydrogen gas is preferably moisturized before it is fed to the electrode to prevent drying up of the anode side of the membrane because 1 mole of protons migrating from the anode to the cathode in the PEMFC accompanies about 3 to 5 moles of water.

Electrode terminals for anode and cathode may be provided either on the carbon cloth or paper sheets or on the carbon plates, and a direct current can be taken from the terminals.

PEMFC's comprising the gas-diffusible electrode assemblies prepared in accordance with the present invention are suitably used for automobiles, submarines, aerospace applications, on-site power generation, replacements of various secondary batteries such as nickel-cadmium batteries and the like, and further advantageously used to utilize hydrogen gas produced in brine electrolysis. Moreover, warm water produced at the cathode side of the PEMFC may be used for heating.

According to the present invention, the copolymer of the same form as that of the cation exchange membrane is used for the binder of the electrode catalyst layer or the binder used in the bonding of the membrane and the electrode catalyst layers, and therefore, the conditions of the hot pressing can be readily established. Further, when sulfonic groups of the copolymers are of K- or Na-form, the hot pressing can be carried out at an elevated temperature and thus the contact and the adhesion between the cation exchange membrane and the electrode catalyst layers are significantly improved. Accordingly, the electric resistivity of the assembly is remarkably reduced and this means that the method of the present invention is able to provide electrode assemblies for PEMFC's capable of gaining a high cell voltage. Moreover, by using an appropriate thickness of the cation exchange membrane, the electric resistivity of the assembly is remarkably reduced. This also means that the method of the present invention is able to provide electrode assemblies for PEMFC's capable of gaining a high cell voltage.

In addition, according to the second embodiment of the present invention, two electrode catalyst layers provided on the carbon cloth or paper sheets can be bonded to the both surface of the cation exchange membrane by one hot pressing operation, and therefore the electrode assemblies for PEMFC's can be manufactured by the method of the present invention with high efficiency.

EXAMPLES

The present invention will be further illustrated by referring to the following working examples, but the present invention is not limited to these specific examples.

Example 1

There is provided a cation exchange membrane composed of a perfluorosulfonic acid copolymer of K-form represented by the formula (1) (thickness of dry state: 140 $\mu$m, ion exchange capacity: 1.12 meq/g of dry resin, softening temperature: about 220° C., average molecular weight: about 500,000).

Separately, electrode catalyst-containing paste was prepared by mixing carbon particles having an average diameter of 25 angstroms and loading 20% by weight of platinum catalyst based on the weight of the carbon particles on their surface (20% Pt on VULCAN XC-72 from E-TEK, Inc.) with NAFION SOLUTION (sold by Aldrich Chemical Co., Ltd.), which is a 5% solution of an H-form perfluorosulfonic acid copolymer of the formula (1) having hydrogen atoms as X, so that the weight ratio of the catalyst particles to the solid content contained in NAFION SOLUTION is 3.1:1 and sufficiently stirring the mixture by means of a homogenizing mixer.

Then, the resulting paste was treated with 5% (by weight) aqueous solution of KOH in an amount stoichiometrically sufficient to convert the paste into K-form to obtain K-form paste. This paste was uniformly applied to one surface of the cation exchange membrane with a doctor blade coater so that the coated layer has a dry thickness of 10 $\mu$m, the coated layer was set for 10 minutes at room temperature and the layer was dried under a reduced pressure of 10 mmHg for 3 minutes and then 1 mmHg for 30 minutes to remove substantially all of the solvent contained in the coated electrode catalyst layer.

The resulting membrane coated with the catalyst-containing layer was sandwiched with two smooth TEFLON or stainless steel plates of 10 mm thickness, heated from outside of the plates with an electric heater, and, when the temperature of membrane surface had reached at 190° C., subjected to hot pressing with a pressure of 50 kg/cm$^2$ for 30 minutes to bond the electrode catalyst layer and the cation exchange membrane.

On another surface of the membrane, that is, the surface opposite to the one coated with the electrode catalyst layer above, another electrode catalyst layer was provided in the same manner as above. The resulted electrode assembly had the platinum catalyst in an amount of about 0.34 mg/cm$^2$ of one side of surface area of the membrane.

Then, the resulting electrode assembly was immersed in 3% aqueous solution of sulfuric acid at room temperature for 16 hours to convert the copolymers into H-form.

On the surfaces of the cathode and anode electrode catalyst layers provided on the cation exchange membrane, a carbon paper sheet (TGP-120 from Toray Inc., thickness of 0.38 mm) and another carbon paper sheet subjected to a moisture-proof treatment by being impregnated with polytetrafluoroethylene dispersion (dry thickness of 0.25 mm) were placed respectively and compressed to give a PEMFC having an effective area of 15 cm $\times$ 15 cm = 225 cm$^2$.

Further, carbon current collectors were equipped on each of the carbon paper sheets. The carbon current collectors were prepared by mixing fine carbon powder with polyvinylidene fluoride in dry state and molding the mixture into a plate shape by hot pressing and had parallel grooves having a width and depth of 1.2 mm with intervals of 1.2 mm in the perpendicular direction on their surfaces facing to the carbon paper sheets. The fuel gases are fed through the grooves upwardly.

The PEMFC was operated at 80° C. by feeding H$_2$ and O$_2$ gases at pressures of 2.8 kg/cm$^2$ and 4.2 kg/cm$^2$ respectively and the following results were obtained.

| Cell Voltage (Volt) | 0.4 | 0.6 | 0.8 |
| --- | --- | --- | --- |
| Current Density (mA/cm$^2$) | 2400 | 1400 | 350 |

Example 2

There is provided a cation exchange membrane composed of a perfluorosulfonic acid copolymer of Na-form represented by the formula (2) (thickness of dry state: 125 $\mu$m, ion exchange capacity: 1.25 meq/g of dry resin, softening temperature; about 210° C., average molecular weight: about 400,000).

Electrode catalyst layers were formed on both surfaces of the membrane in the same manner as Example 1 except that the hot pressing was carried out at 190° C. The resulting electrode assembly had the platinum catalyst in an amount of about 0.34 mg/cm$^2$. The electrode assembly was immersed in 3% aqueous solution of sulfuric acid at room temperature for 16 hours to convert the copolymers into H-form.

A PEMFC was constructed by using the above-obtained electrode assembly and operated in the same manner as Example 1 except that H$_2$ and O$_2$ gases were fed at pressures of 2.8 kg/cm$^2$ and 2.0 kg/cm$^2$, respectively. The following results were obtained.

| Cell Voltage (Volt) | 0.4 | 0.6 | 0.8 |
| --- | --- | --- | --- |
| Current Density (mA/cm$^2$) | 2900 | 1900 | 500 |

Example 3

There is provided a cation exchange membrane composed of a perfluorosulfonic acid copolymer of Na-form represented by the formula (1) (thickness of dry state: 125 μm, ion exchange capacity: 0.91 meq/g of dry resin, softening temperature; about 240° C., average molecular weight: about 600,000).

Electrode catalyst layers were formed on both surfaces of the membrane in the same manner as Example 1 except that the hot pressing was carried out at 205° C. The resulting electrode assembly had the platinum catalyst in an amount of about 1.00 mg/cm$^2$. The electrode assembly was immersed in 3% aqueous solution of sulfuric acid at room temperature for 16 hours to convert the copolymers into H-form.

A PEMFC was constructed by using the above-obtained electrode assembly and operated in the same manner as Example 1. The following results were obtained.

| Cell Voltage (Volt) | 0.4 | 0.6 | 0.8 |
|---|---|---|---|
| Current Density (mA/cm$^2$) | 2200 | 1200 | 300 |

Example 4

There is provided a cation exchange membrane composed of a perfluorosulfonic acid copolymer of Na-form represented by the formula (1) (thickness of dry state: 60 μm, ion exchange capacity: about 1.10 meq/g of dry resin, softening temperature: about 220° C., average molecular weight: about 500,000).

Electrode catalyst layers were formed on both surfaces of the membrane in the same manner as Example 1. The resulting electrode assembly had the platinum catalyst in an amount of about 1.5 mg/cm$^2$. The electrode assembly was immersed in 3% aqueous solution of sulfuric acid at room temperature for 16 hours to convert the copolymers into H-form.

A PEMFC was constructed by using the above-obtained electrode assembly and operated in the same manner as Example 1. The following results were obtained.

| Cell Voltage (Volt) | 0.4 | 0.6 | 0.8 |
|---|---|---|---|
| Current Density (mA/cm$^2$) | 2700 | 1700 | 450 |

Example 5

There is provided a cation exchange membrane composed of a perfluorosulfonic acid copolymer of H-form represented by the formula (1) (thickness of dry state: 125 μm, ion exchange capacity: 1.12 meq/g of dry resin, softening temperature: about 140° C., average molecular weight: about 400,000).

Separately, electrode catalyst-containing paste was prepared by mixing carbon particles having a surface area of about 200 m$^2$/g and an average diameter of about 100 angstroms (VULCAN XC-72 from E-TEK, Inc.) and carrying 9.9% by weight of platinum catalyst having a diameter of 5 to 20 angstroms based on the weight of the carbon particles on their surface with about 50% by weight dispersion of polytetrafluoroethylene so that the dispersion contained about 50% by weight of polytetrafluoroethylene.

The paste was applied to a carbon cloth sheet (Torayca #6644B, plain weave carbon cloth from Toray Inc., thickness; 0.38 mm, unit weight: 320 g/m$^2$) in a thickness of about 100 μm and dried. Then, the sheet was subjected to hot pressing at 340° C. for about 25 minutes to obtain a carbon cloth sheet for anode having an electrode catalyst layer with the platinum catalyst in an amount of about 0.5 mg/cm$^2$ of electrode area (Carbon cloth sheet I).

In the same way as above, a carbon cloth sheet having an electrode catalyst layer is obtained. Then, a paste prepared by mixing the carbon particles (VULCAN XC-72) not carrying the platinum catalyst with the polytetrafluoroethylene dispersion in the same manner as above was applied to the surface of the sheet opposite to the one provided with the electrode catalyst layer and the sheet was subjected to hot pressing at 340° C. for about 25 minutes to form a water-repellent layer. Thus, a carbon cloth sheet having the electrode catalyst layer and the water-repellent layer was obtained (Carbon cloth sheet II).

The surfaces of the electrode catalyst layers of Carbon cloth sheets I and II were applied with NAFION SOLUTION (sold by Aldrich Chemical Co., Ltd.), which is a 5% solution of an H-form perfluorosulfonic acid copolymer of the formula (1) having protons as X in a thickness of from about 5 to 10 μm (dry thickness), and the applied layers were dried. Then, the cation exchange membrane and Carbon cloth sheets I and II were stacked so that the electrode catalyst layer surfaces of Carbon cloth sheets I and II, i.e., the applied NAFION SOLUTION layers, face to the surfaces of the cation exchange membrane respectively and subjected to hot pressing at a temperature of about 130° C. and a pressure of about 140 kg/cm$^2$ for about 60 minutes to bond the membrane and the electrode catalyst layers to give an electrode assembly for PEMFC's.

Then, carbon current collectors were provided on each of the carbon cloth sheets via thermoresistant gaskets comprising silicone rubber to obtain a PEMFC having an effective area of 12.5 cm × 12.5 cm. The carbon current collectors were prepared by mixing fine carbon powder with polyvinylidene fluoride in dry state and molding the mixture into a plate shape by hot pressing and they had parallel grooves having a width and depth of 1.2 mm with intervals of 1.2 mm in the perpendicular direction on their surfaces facing to the carbon paper sheets and internal conduits for supplying cooling water close to the grooves.

The PEMFC was operated by feeding H$_2$ and O$_2$ gases at pressures of 3 atm. and 5 atm. respectively and the following results were obtained.

| Cell Voltage (Volt) | 0.71 | 0.62 | 0.51 |
|---|---|---|---|
| Current Density (mA/cm$^2$) | 1000 | 2000 | 3000 |

Example 6

There is provided a cation exchange membrane composed of a perfluorosulfonic acid copolymer of H-form represented by the formula (2) (thickness of dry state: 125 μm, ion exchange capacity: 1.33 meq/g of dry resin, softening temperature: about 130° C., average molecular weight: about 500,000).

An electrode assembly for PEMFC's was fabricated by using the above cation exchange membrane in the same manner as Example 5 except that the hot pressing for bonding the electrode catalyst layers and the membrane was carried out at a temperature of about 120° C. and a pressure of about 140 kg/cm² for about 60 minutes.

A PEMFC was constructed by using the above-obtained electrode assembly and operated in the same manner as Example 5. The following results were obtained.

| Cell Voltage (Volt) | 0.78 | 0.68 | 0.58 |
|---|---|---|---|
| Current Density (mA/cm²) | 1000 | 2000 | 3000 |

Example 7

There is provided a cation exchange membrane composed of a perfluorosulfonic acid copolymer of H-form represented by the formula (1) (thickness of dry state: 76 μm, ion exchange capacity: 1.12 meq/g of dry resin, softening temperature: about 135° C., average molecular weight: about 400,000).

An electrode assembly for PEMFC's was fabricated by using the above cation exchange membrane in the same manner as Example 5 except that the hot pressing for bonding the electrode catalyst layer and the membrane was carried out at a temperature of about 125° C. and a pressure of about 130 kg/cm² for about 60 minutes.

A PEMFC was constructed by using the above-obtained electrode assembly and operated in the same manner as Example 5. The following results were obtained.

| Cell Voltage (Volt) | 0.73 | 0.63 | 0.53 |
|---|---|---|---|
| Current Density (mA/cm²) | 1000 | 2000 | 3000 |

Example 8

There is provided a cation exchange membrane composed of a perfluorosulfonic acid copolymer of Na-form represented by the formula (1) (thickness of dry state: 100 μm, ion exchange capacity: 1.12 meq/g of dry resin, softening temperature: about 220° C., average molecular weight: about 500,000).

An electrode assembly for PEMFC's was fabricated by using the above cation exchange membrane in the same manner as Example 5 except that the electrode catalyst layers were formed so that they contained the platinum catalyst in an amount of about 0.3 mg/cm², that NAFION SOLUTION neutralized with 5% by weight NaOH aqueous solution in an amount sufficient to replace substantially all of the hydrogen atoms in the sulfonic acid groups contained in NAFION SOLUTION with Na+ was used instead of NAFION SOLUTION and that the hot pressing for bonding the electrode catalyst layer and the membrane was carried out at a temperature of about 210° C. and a pressure of about 150 kg/cm² for about 60 minutes. The resulting electrode assembly was immersed in 5% aqueous solution of sulfuric acid at room temperature for 16 hours to convert the copolymers into H-form.

A PEMFC was constructed by using the above-obtained electrode assembly and operated in the same manner as Example 5. The following results were obtained.

| Cell Voltage (Volt) | 0.72 | 0.62 | 0.52 |
|---|---|---|---|
| Current Density (mA/cm²) | 1000 | 2000 | 3000 |

Example 9

A electrode assembly for PEMFC's was fabricated in the same manner as Example 5 except that a carbon paper sheet (Torayca TPG-120 from Toray Inc., thickness: 0.37 mm, unit weight: 170 g/m²) was used instead of the carbon cloth sheet.

A PEMFC was constructed by using the obtained electrode assembly and operated in the same manner as Example 5. The following results were obtained.

| Cell Voltage (Volt) | 0.72 | 0.62 | 0.52 |
|---|---|---|---|
| Current Density (mA/cm²) | 1000 | 2000 | 3000 |

What is claimed is:

1. A method for fabricating an electrode assembly for solid polymer electrolyte fuel cells comprising a cation exchange membrane provided with an electrode catalyst layer and a carbon cloth or paper layer in this order on each of the surfaces of the membrane, the method comprising the steps of:

(a) providing a cation exchange membrane comprising a perfluorosulfonic acid group-containing copolymer comprising tetrafluoroethylene units and perfluorovinyl ether units having sulfonic acid groups on their side chains and represented by the following formula (1) or (2);

wherein X represents H, Na or K, k is about 2.1 to about 7.6, m is about 3.8 to about 9.3 and 1 and n represent a positive integer, where the membrane has a thickness of from 50 to 100 μ m in dry state at room temperature and an ion exchange capacity of 1.12 to 1.43 meq/g (dry resin), (b) bonding the electrode catalyst layers and the carbon cloth or paper layers on both surfaces of the cation exchange membrane by;
        (i) preparing a uniform mixture of electrode catalyst loaded on fine carbon particles and a polytetrafluoroethylene dispersion,
        (ii) applying the mixture on a surface of a sheet of electroconductive and gas permeable carbon cloth or paper and subjecting the sheet having the applied mixture layer to hot pressing to obtain a carbon cloth or paper sheet for anode having an electrode catalyst layer formed from the applied mixture layer, (iii) repeating the procedure of the above step (ii) to obtain a carbon cloth or paper sheet having an electrode catalyst layer, applying a mixture containing fine carbon particles and a polytetrafluoroethylene dispersion to a surface of the sheet opposite to the one provided with the electrode catalyst layer and subjecting the sheet to hot pressing to obtain a carbon cloth or paper sheet for cathode having the electrode catalyst layer and a water-repellent layer formed from the applied mixture layer of fine carbon particles and a polytetrafluoroethylene dispersion, (iv) preparing a solution or dispersion of perfluorosulfonic acid copolymer represented by the above formula (1) or (2) where X represents the same element as the element X of the copolymer of the cation exchange membrane, (v) applying the solution or the dispersion to either or both of the surfaces of the electrode catalyst layers formed on the carbon cloth or paper sheets for anode and cathode and the surfaces of the cation exchange membrane, (vi) stacking the cation exchange membrane and the carbon cloth or paper sheets so that each of the surfaces of the electrode catalyst layers formed on the carbon cloth or paper sheets are in contact with each of the both surfaces of the cation exchange membrane, (vii) subjecting the stacked cation exchange membrane and carbon cloth or paper sheets to hot pressing at a temperature lower than the softening temperature of the perfluorosulfonic acid copolymer of the cation exchange membrane by 10° C. or more to give the electrode assembly.

2. The method of claim 1 wherein the cation exchange membrane has a thickness of from 70 to 140 $\mu$m.

3. The method of claim 1 wherein the electrode catalyst is platinum.

4. The method of claim 3 wherein platinum electrode catalyst is coated on carbon particles having a diameter of from about 50 to 100 angstrom in an amount of 5 to 30% by weight of the carbon particles.

5. The method of claim 1 wherein the electrode catalyst layer is formed so that it has a thickness of less than 50 $\mu$m.

6. The method of claim 3 wherein the platinum catalyst is applied so that the electrode assembly has the catalyst in an amount of from 0.04 to 4.0 mg/cm$^2$.

7. The method of claim 1 wherein a water-repellent layer is formed on the surface of the carbon cloth or paper sheet of the cathode side opposite to the surface provided with the electrode catalyst layer.

8. The method of claim 1 wherein the solution or the dispersion contains the copolymer in an amount of from 1 to 5% by weight of the solution or the dispersion.

9. The method of claim 1 wherein the hot pressing is carried out at a temperature lower than 250° C.

10. The method of claim 1 wherein the copolymer has a average molecular weight of from 50,000 to 1,500,000.

* * * * *